United States Patent
Yoneda et al.

[19]

[11] Patent Number: 6,108,157
[45] Date of Patent: Aug. 22, 2000

[54] HEAD MECHANISM CONTROL APPARATUS, DISK DRIVE, AND HEAD UNLOAD CONTROL METHOD

[75] Inventors: Isao Yoneda, Yokohama; Hiroshi Uchiike, Yamato; Shinji Ueno; Kenji Ogasawara, both of Fujisawa, all of Japan

[73] Assignee: International Business Machines Corporation, Armonk, N.Y.

[21] Appl. No.: 09/105,901

[22] Filed: Jun. 26, 1998

[30] Foreign Application Priority Data

Jun. 27, 1997 [JP] Japan ................................. 9-171569

[51] Int. Cl.⁷ .................................................. G11B 21/02
[52] U.S. Cl. .................................................. 360/75
[58] Field of Search ........................................ 360/75, 105

[56] References Cited

U.S. PATENT DOCUMENTS 5,455,723  10/1995  Boutaghou et al. ................... 360/75
5,969,899  10/1995  Utenick et al. ..................... 360/78.04

FOREIGN PATENT DOCUMENTS 64-1173  5/1989  Japan ................................ G11B 21/12

*Primary Examiner*—Paul Loomis
*Assistant Examiner*—K. Wong
*Attorney, Agent, or Firm*—Robert B. Martin

[57] ABSTRACT

The invention relates to a head mechanism control apparatus for magnetic recording device which ensures that the transducer head has been unloaded in a head unloading operation. A head slider having a transducer head is mounted on a head arm and is unloaded from the disk by the swinging of the head arm. The retract position is at the limit portion of the swingable range of the head arm. When the head slider is successfully unloaded to the retract position, a drive force applied to the head arm in the unload direction causes little movement of the head arm. After an unloading is performed, a position check drive force is applied to the head arm and the moving speed of the head slider is detected. Based on the moving speed, it is judged whether the head slider has been unloaded to the retract position. If the head slider has not been unloaded to the retract position, re-unloading is performed for moving the head slider to the retract position.

10 Claims, 6 Drawing Sheets

HEAD MECHANISM CONTROL APPARATUS, DISK DRIVE, AND HEAD UNLOAD CONTROL METHOD

BACKGROUND OF THE INVENTION

1. Field of the Invention

The present invention relates to a head mechanism control apparatus for controlling a head mechanism used for unloading from a recording medium a transducer head, a disk drive using the head mechanism control apparatus, and an unload control method for the transducer head in a disk drive, and particularly to a head mechanism control apparatus which can prevent mis-unloading in which unloading is terminated without the transducer head in the retract position.

2. Description of Related Art

In the load/unload mechanism, by moving a head arm having mounted thereon the head slider over a ramp provided in the vicinity of the inner periphery or the outer periphery of a disk, the head slider is unloaded to a retract position outside the disk, and the head slider is loaded over the disk by moving the head arm from the ramp. The head arm is mounted to a voice coil motor (VCM).

The head arm in the load/unload mechanism slides on the ramp surface in the unload direction to unload the head slider to the retract position, and it slides on the ramp surface in the load direction and away from the ramp surface to load the head slider over the disk. Further, the load/unload mechanism does not intentionally put the head slider in contact with the disk surface. The operation of such load/unload mechanism is controlled by the head mechanism control apparatus. The head mechanism control apparatus controls the drive current to be fed through the voice coil, thereby to perform the loading/unloading of the head slider.

Further, a latch mechanism is provided in the disk drive. The latch mechanism latches the head arm if a shock is applied to the disk drive when the head arm is at the retract position, thereby preventing the head arm from moving in the load direction and contacting the surface of the disk. The accidental contact of the head slider with the disk surface is called accidental landing. The disk surface is smooth, and if the accidental landing occurs, the disk surface may be scratched or the head slider may stick to the disk surface.

In the unload sequence of the above conventional head mechanism control apparatus, the sequence is ended when the control of the drive current for swinging the head arm in the unload direction is terminated. It is not verified that the head slider has been unloaded to the retract position. Mis-unloading can be caused due to a disturbance such as a shock during the execution of the unloading.

The mis-unloading can lead to accidental landing. If the head arm does not mount on the ramp and the head slider remains on the disk, the accidental landing is caused by a power save mode or the like when the rotation of the disk is stopped. Further, even if the head arm mounts on the ramp, a latch of the latch mechanism may not engage because the head arm has not returned to the retract position. If a shock is applied to the disk drive, the head arm can drop from the ramp to cause the accidental landing.

The present invention solves such problems of the background art, and its object is to provide a head mechanism control apparatus which can prevent mis-unloading.

SUMMARY OF THE INVENTION

To accomplish the above object, the head mechanism control apparatus of the present invention checks the position of the transducer head after the execution of unloading, and performs re-unloading of the transducer head to the retract position if the transducer head has not been unloaded to the retract position. The above detection of the position of the transducer head enables the judgment as to whether or not the transducer head has been unloaded to the retract position.

Whether or not the transducer head has been unloaded to the retract position is judged, for instance, based on the amount of movement of the transducer head when a drive force of the same direction as unloading is applied to the head mechanism, or on the output of an optical position sensor such as a photo coupler for detecting the position of the transducer head. The amount of movement of the transducer head is, for instance, a moving speed (including moving angle speed) or a moving distance (including moving angle).

For the judgment based on the amount of movement of the transducer head, for instance, the retract position is made the limit portion for the movable range of the transducer head. If the transducer head is at the retract position, the movement amount is zero or a very small value. If the transducer head is not at the retract position, the amount of movement is a value larger than the value when the transducer head is at the retract position. Accordingly, if the movement amount is larger than a certain value, it can be judged that the transducer head is not at the retract position.

Other objects, features, and advantages of the present invention will be apparent from the accompanying drawings and from the detailed description below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE PREFERRED EMBODIMENT

Figure 1:
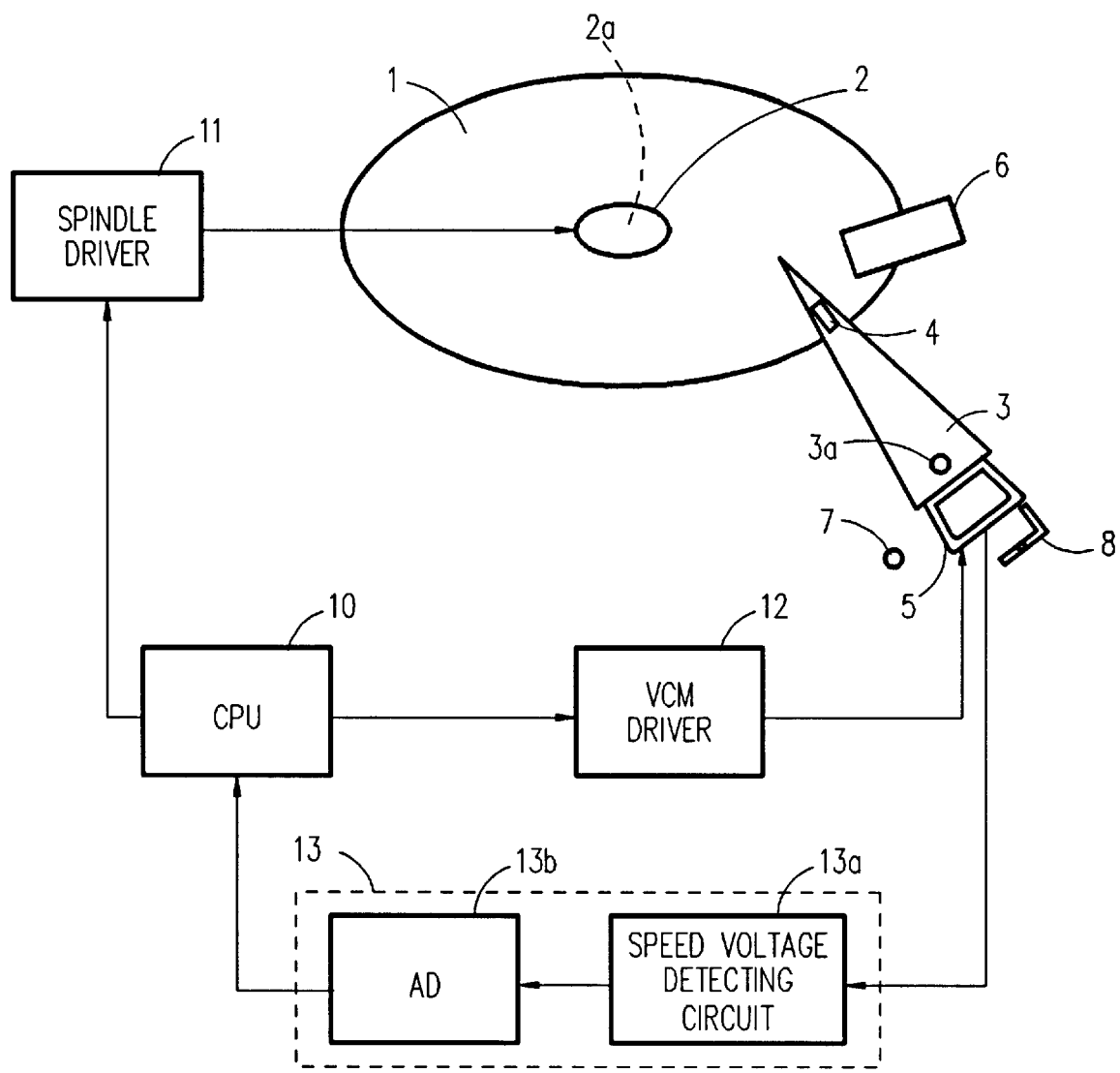
FIG. 1 is a diagram showing an embodiment of the disk drive of the present invention.

FIG. 1 is a diagram showing the construction of an embodiment of the disk drive of the present invention. The disk drive shown in FIG. 1 has a disk 1, a spindle motor 2, a head arm 3, a head slider 4, a voice coil 5, a ramp 6, a crash stop 7, a latch mechanism 8, a CPU 10, a spindle driver 11, a voice coil motor (VCM) driver 12, and a speed detecting circuit 13.

The disk 1, which is a data recording medium, is fixed to the spindle shaft 2a of the spindle motor 2. The spindle motor 2 rotates the disk 1. The head slider 4 having a transducer head for recording data on the disk 1 and reading in data from the disk 1, and the voice coil 5 are both mounted on the head arm 3. The head arm 3 swings about a pivot 3a. The voice coil 5 forms the VCM in conjunction with a permanent magnet, not shown. The VCM causes the actuator 3 to swing. The ramp 6 supports the head arm 3 when the head slider 4 is unloaded and the head arm 3 is at the retract position. The head arm 3, VCM, and the ramp 6 are the load/unload mechanism for loading the head slider 4 over the disk 1 and unloading it from the disk 1 to the retract position.

When the head arm 3 is at the retract position, the latch mechanism 8 latches the head arm 3 if a shock is applied to the disk drive, thereby preventing the head arm 3 from moving. The spindle driver 11 drives the spindle motor 2 in response to an instruction from the CPU 10. The VCM driver 12 feeds a drive current through the voice coil 5 in response to an instruction from the CPU 10, thereby to drive the head arm 3. The speed detecting circuit 13 detects the moving speed of the head slider 4 (the swing speed of the head arm 3), and it has a speed voltage detecting circuit 13a and an AD converter 13b.

The disk drive shown in FIG. 1 detects the position of the head slider 4 after the execution of unloading to judge whether or not the head slider 4 has been unloaded to the retract position, and performs re-unloading in order to move the head slider 4 to the retract position if the head slider 4 has not been unloaded to the retract position, thereby avoiding mis-unloading.

The CPU 10 and the speed detecting circuit 13 form a head mechanism control apparatus for controlling the above load/unload mechanism through the VCM driver 12. The head mechanism control apparatus has a load/unload control means for performing the loading/unloading of the head slider 4, a drive force application control means for applying to the head arm 3 a position check drive force in the same direction as unloading after the unloading is performed, the speed detecting circuit 13 (movement amount detecting means) for detecting the moving speed of the head slider 4 when the position check drive force is applied, a judging means for judging, based on the detected moving speed, whether or not the head slider 4 has been unloaded to the retract position, a re-unload control means for performing re-unloading if the head slider 4 has not been unloaded to the retract position, and a retry control means for repeating re-unloading if the head slider 4 has not been unloaded to the retract position by the re-unloading. In addition, the drive force application control means and the speed detecting circuit 13 form a position check data generating means for generating position check data (in this embodiment, moving speed) for detecting the position of the head slider 4 after the execution of the unloading.

The CPU 10 has the above load/unload control means, drive force application control means, re-unload control means, and retry control means. These means are based, for instance, on microcodes stored in a memory device within the CPU 10. The CPU 10 also has a spindle motor controller for controlling the spindle motor 2 through the spindle driver 11.

Figure 2A:
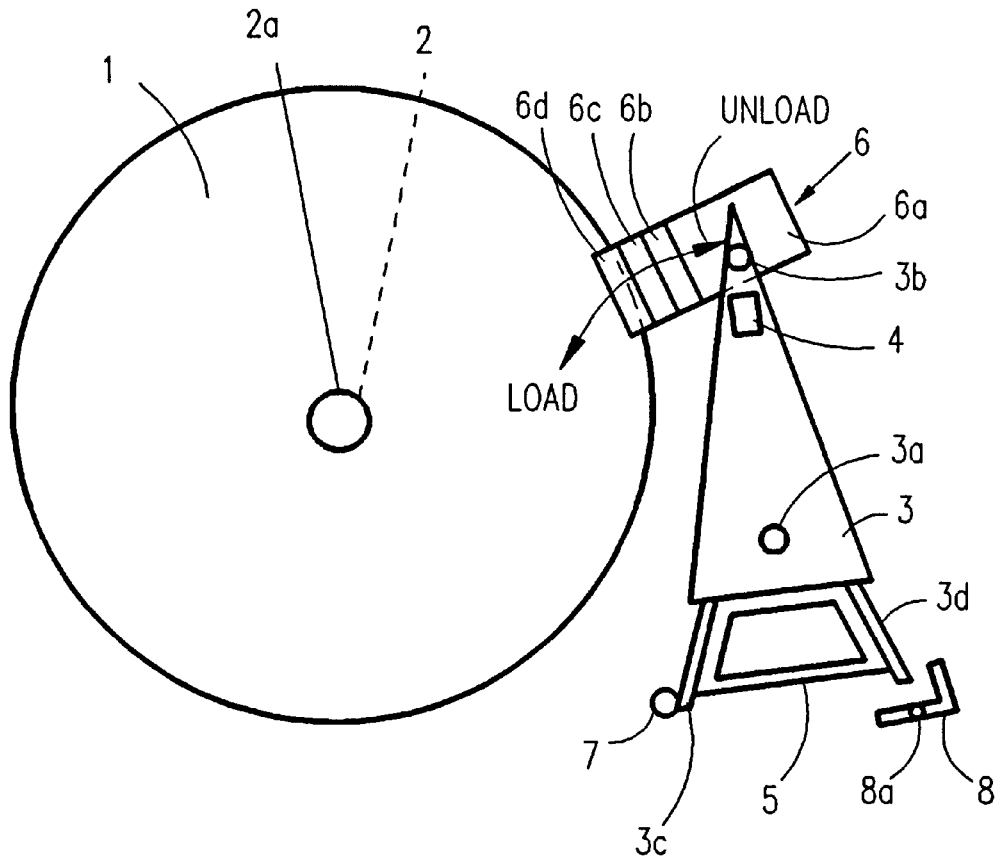
FIGS. 2(a, b) is a diagram of the loading/unloading of the head slider in the embodiment of the disk drive of the present invention.
Figure 2B:
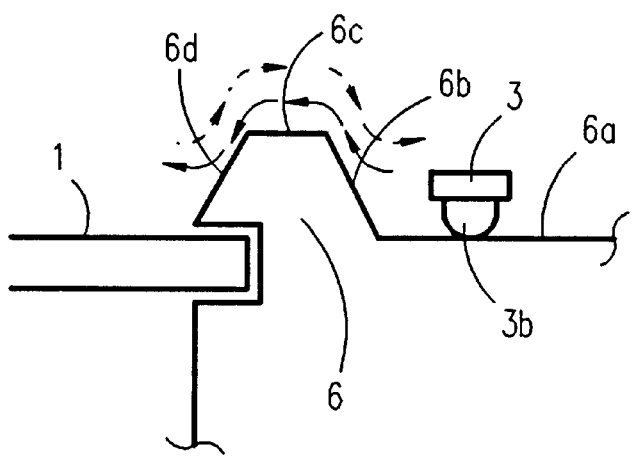

FIG. 2 is a diagram explaining the loading/unloading of the head slider 4, in which (a) is a top view, and (b) is a sectional view including a projecting portion 3b formed in the head arm 3, and the ramp 6. By feeding a drive current through the voice coil 5, the head arm 3 is caused to swing about the pivot 3a. In FIG. 2(a), the clockwise direction is the unload direction, and the counterclockwise direction is the load direction. When the head slider 4 is unloaded to the retract position, the projecting portion 3b formed in the head arm 3 is in contact with the parking surface 6a of the ramp 6. Further, the coil support portion 3c of the head arm 3 is in contact with or very close to the crash stop 7. The crash stop 7 defines the swingable range of the head arm 3 in the load direction. The retract position is at the limit in the unload direction of the swingable range of the head arm 3, and thus the head arm 3 cannot swing in the unload direction beyond the retract position.

In FIGS. 1 and 2, if the loading of the head slider 4 is carried out, the head arm 3 swings in the load direction to cause the head slider 4 to move over the disk 1. The projection portion 3b slides on the surface of the ramp 6, and leaves from slope 6d. The position of the head arm 3 when the head slider 4 is loaded is shown in FIG. 1. If the unloading of the head slider 4 is performed, the head arm 3 swings in the unload direction, and the projecting portion 3b slides on the surface of the ramp 6 in the unload direction, reaching the parking surface 6a (refer to FIG. 2). If a shock is applied to the disk drive when the head arm 3 is at the retract position, the latch mechanism 8 swings around a pivot 8a in the counterclockwise direction to hook the coil support portion 3d of the head arm 3, thereby latching the head arm 3.

If the head arm 3 has not return to the retract position when the unloading is terminated, it is mis-unloading. In particular, if the head slider 4 remains over the disk 1, accidental landing occurs if the disk 1 stops its rotation. Further, if the projecting portion 3b of the head arm 3 stops at the slope 6d or top surface 6c of the ramp 6, the accidental landing can also occur if a shock is applied, because the head arm 3 cannot be latched by the latch mechanism 8.

In the disk drive shown in FIG. 1, to avoid mis-unloading, a position check drive force is applied to the head arm 3 after the execution of the unloading, as described above, to check the position of the head arm 3. The position check drive force is applied in the unload direction. The magnitude of the position check drive force is set so that the projecting portion 3b of the head arm 3 can move on the surface of the ramp 6 when the projecting portion 3b is in contact with the ramp 6 surface and the head arm is not at the retract portion. The position check drive force is applied to the head arm 3 after the unloading is performed to detect the swing speed of the head arm 3 or the moving speed of the head slider 4 at this point of time. If the head arm 3 or the head slider 4 is unloaded at the retract position, the moving speed becomes zero or a very small value because of the crash stop 7; otherwise, the moving speed becomes a value larger than that when the head slider 4 is unloaded at the retract position (including the case where is on desk 1). Accordingly, when the moving speed is larger than a certain value while the position check drive force is applied, it can be judged that the head slider 4 has not unloaded to the retract position.

Figure 3:
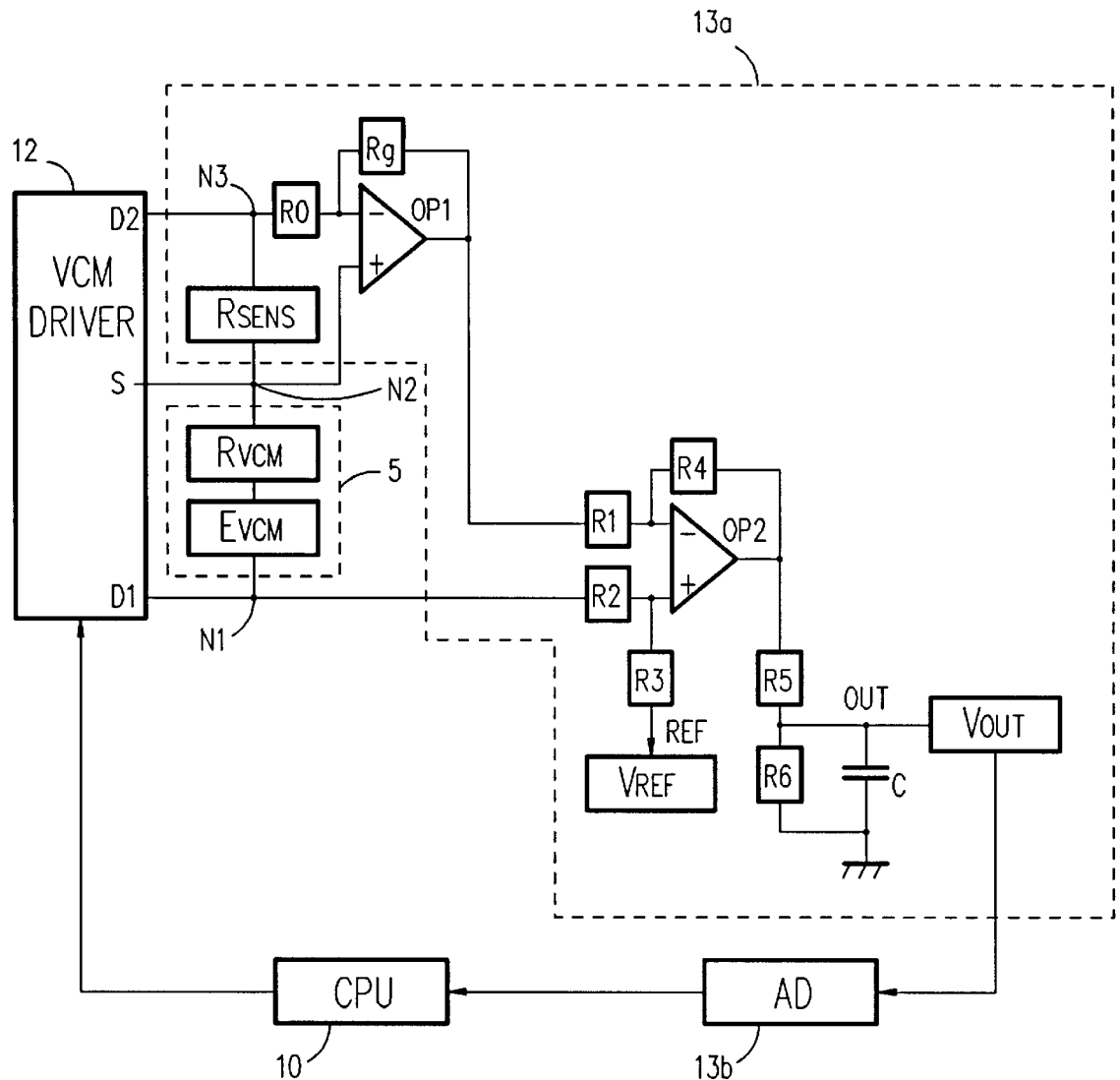
FIG. 3 is a diagram showing the head control apparatus for controlling the load/unload mechanism in the embodiment of the drive disk of the present invention.

FIG. 3 is a diagram showing the head mechanism control apparatus in the disk drive shown in FIG. 1. As described above, the head mechanism control apparatus shown in FIG. 3 has a CPU 10, the speed voltage detecting circuit 13a, and the AD converter 13b. In the voice coil 5 in FIG. 3, Rvcm represents the equivalent resistance of the coil, and Evcm represents the counterelectromotive force generated in the coil as the coil moves. The speed voltage detecting circuit 13a is a circuit for outputting a voltage proportional to the counterelectromotive force Evcm of the voice coil 5. The speed voltage detecting circuit 13a comprises, for instance, as shown in FIG. 3, a first differential part consisting of resistors Rsens, R0, and Rg and an operational amplifier OP1, a second differential part consisting of resistors R1 to R6, a capacitor C, and an operational amplifier OP2, a terminal REF to which a reference voltage Vref is applied, and a terminal OUT. The voice coil 5 is interposed between nodes N1 and N2, and the resistor Rsens is interposed between the node N2 and a node N3. The nodes N1 to N3 are connected to the terminals D1, S, and D2 of the VCM driver 12, respectively. The drive current of the voice coil 5 is supplied from the VCM drive 12 mainly via the terminal D1-resistor Rsens-voice coil 5-terminal D2. If the values of the resistors Rsens, R0, and Rg are set so as to satisfy Rvcm/Rsens=Rg/R0, with respect to the coil resistor Rvcm, the voltage Vout of the terminal OUT takes a value proportional to the counterelectromotive force Evcm.

Since the magnitude of the counterelectromotive force Evcm is proportional to the swing speed of the head arm 3, or the moving speed of the head slider 4, the magnitude of the output voltage Vout of the speed voltage detecting circuit 13a is proportional to the moving speed of the head slider 4. The voltage proportional to the moving speed of the head slider 4 is called a speed voltage. The speed voltage Vout is converted to digital data by the AD converter 13b and inputted to the CPU 10.

Loading/unloading/re-unloading is performed by feeding a drive current through the voice coil 5 from the VCM driver 12 to drive the head arm 3 in the load direction or the unload direction as described above. The drive current fed through the voice coil 5 is called a VCM current. The methods for driving the head arm 3 include speed control drive and forced drive. In the speed control drive, the head arm 3 is driven so that the swing speed of the head arm 3 (head speed) becomes a predetermined profile (predetermined value), and in this embodiment, the head arm 3 is driven at a fixed speed. The speed detecting circuit 13 is also used in the driving of the head arm 3 by the speed control drive. In the speed control drive, the CPU 10 controls the VCM current value by the VCM driver 12 based on the head speed detected by the speed detecting circuit 13. In the forced drive, a VCM current of a predetermined profile (predetermined value) is fed to drive the head arm 3 regardless of the head speed, and in this embodiment, a fixed VCM current is fed to drive the head arm 3.

In this embodiment, the speed control drive is used for loading/unloading, and the forced drive is used for re-unloading. The unloading by the speed control drive puts the head arm 3 in contact with the ramp 6 at a predetermined speed. The forced drive may be used for unloading, and the speed control drive may be used for re-unloading.

When the above described position check drive force is applied, a VCM current provides a position check drive force to the head arm 3. This VCM current is called a position check VCM current. The position check VCM current is a fixed current in this embodiment.

Figure 4:
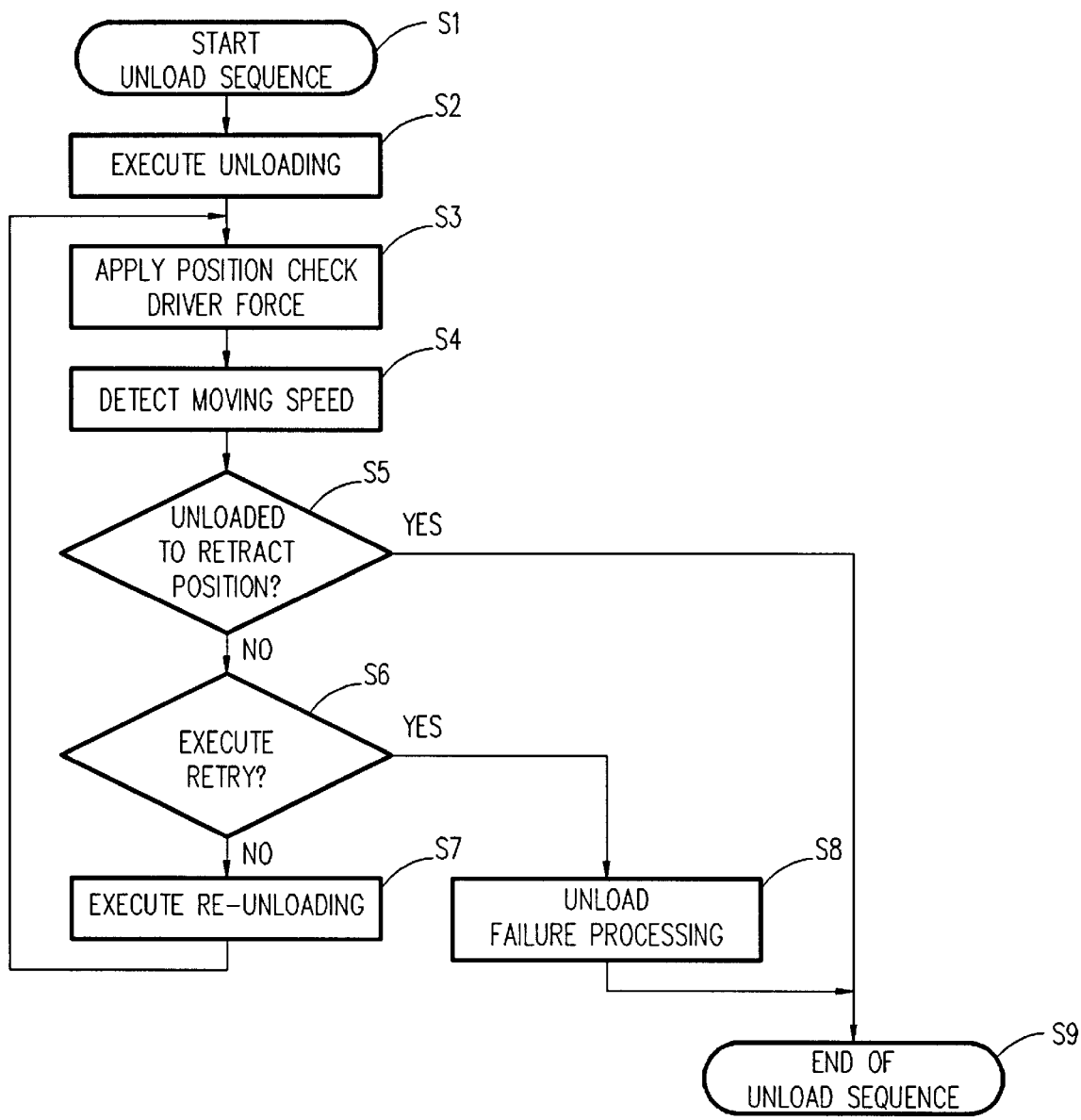
FIG. 4 is a flowchart showing the unload sequence in the embodiment of the disk drive of the present invention.

FIG. 4 is a flowchart showing the unload sequence of the head slider 4 in the disk drive shown in FIG. 1. When the unload sequence is started in step S1, the load/unload control means of the CPU 10 performs the unloading of the head slider 4 by the VCM driver 12 and the VCM in step S2.

When the above unloading is terminated, the drive force application control means of the CPU 10 feeds a position check VCM current through the voice coil 5 from the VCM driver 12 in step S3, thereby applying a position check drive force in the unload direction to the head arm 3.

When the above position check drive force is applied to the head arm 3, in step S4, the moving speed of the head slider 4 is detected by the speed detecting circuit 13, and in step S5, the judging means of the CPU 10 judges that the head slider 4 has been unloaded to the retract position if the detected moving speed is smaller than a predetermined value. If the moving speed is equal to or larger than the predetermined value, it judges that the head slider 4 has not been unloaded to the retract position. If it is judged in step S5 that the head slider 4 is at the retract position, the process goes to step S8 to terminate the unload sequence.

If it is judged in step S5 that the head slider 4 has not returned to the retract position yet, the load/unload control means of the CPU 10 performs the re-unloading of the head slider 4 by the VCM driver 12 and the VCM in step S7 through step S6.

If the re-unloading is terminated, the process returns to step S3, and the position of the head slider 4 is checked in steps S3 and S4. The process goes to step S6 if the head slider 4 has not returned to the retract position.

In step S6, the retry control means of the CPU 10 judges whether or not a retry is performed. In this embodiment, the retry is performed until the number of executions of re-unloading reaches a preset maximum number of executions. The maximum number of executions of re-unloading is set to five in this embodiment. The maximum number of executions is set to five because it was experimentally verified by the present inventors that, in the load/unload mechanism shown in FIGS. 1 and 2, the head slider 4 can reliably be returned to the retract position if the re-unloading is executed five times. If the head slider 4 does not return to the retract position after the re-unloading is executed five times, there may be a failure of the load/unload mechanism or the like.

To perform the retry, the re-unloading is performed in step S7, and the process returns to step S3. By steps S3 to S7, the retry is repeated until the head slider 4 returns to the retract position. If the head slider 4 does not return to the retract position when the number of executions of the re-unloading becomes five, the CPU 10 executes an unload failure processing including continuation of the disk rotation, thereby to inform the outside of the abnormal termination of the unloading.

FIG. 5 is a diagram showing VCM current profiles in the unload sequence in the disk drive shown in FIG. 1, in which (a) is the VCM current profile when the head slider 4 is returned to the retract position only by the execution of unload, and (b) is the VCM current profile when the head slider 4 is returned to the retract position by one execution of the re-unloading.

Figure 5A:
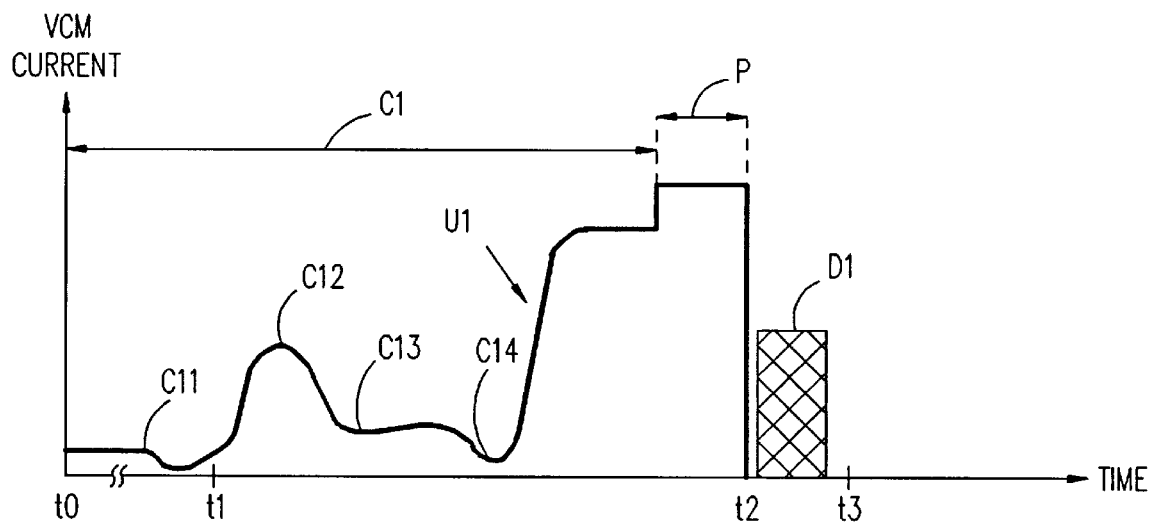
FIGS. 5(a, b) is a diagram showing the profile of the VCM current in the unload sequence of the embodiment of the disk drive of the present invention.

In FIG. 5(a), the unloading is started at time t0, the head arm 3 moves over the disk 1 in the unload direction during a time period of t0 to t1, the head arm 3 contacts with the ramp 6 at time t1, and the unloading is terminated at time t2. Further, the position of the head slider 4 is checked during 2 time period of t2 to t3 (the head slider 4 is at the retract position), and the unload sequence is completed at time t3. In the background art, the unload sequence is completed at time t2 regardless of the position of the head slider 4. The portion of time t2 to t3 is different from the background art. The VCM current profile shown in FIG. 5(a) has an unload VCM current part U1 and a position check VCM current part D1. The unload VCM current part U1 consists of a sequentially changing speed control current part C1 and a last push part P.

First, in the speed control current part C1, the head arm 3 moves over the disk 1 at a fixed speed and contacts with the slope 6d of the ramp 6, and it slides on the ramp 6 surface at a fixed speed so as to be unloaded to the retract position.

The last push part P is provided to increase the reliability of unload. The projecting portion 3b of the head arm 3 moves over the disk 1 by C11 of the speed control current part C1, climbs up the slope 6d of the ramp 6 by C12, slides on the top surface 6c by C13, and moves down the slope 6d by C14, reaching the parking surfaces 6a. Then, a position check drive force is applied to the head arm 3 by the position check VCM current part D1, and the moving speed of the head slider 4 is detected by the speed detecting circuit 13. Based on the moving speed, it is judged that the head slider 4 has returned to the retract position. The unload sequence is completed at time t3.

Figure 5B:
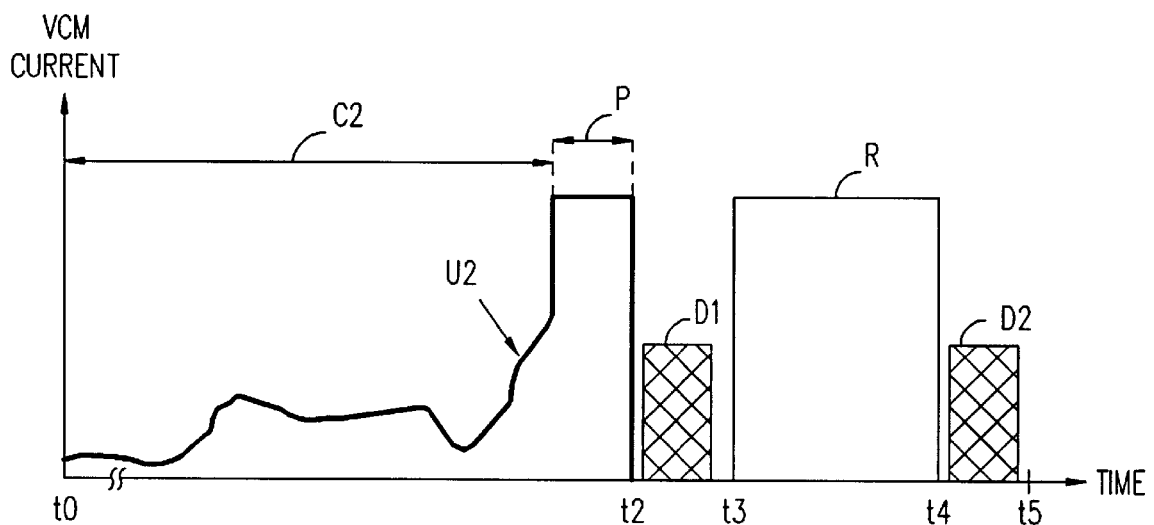

In FIG. 5(b), unloading is performed during a time period of t0 to t2. The position of the head slider 4 is checked during a time period of t2 to t3 (the head slider 4 has not returned to the retract position yet). Re-unloading is performed during the time t3 to t4. The position of the head slider 4 is checked during a time period of t4 to t5 (the head slider 4 is at the retract position), and the unload sequence is completed at time t5. In the background art, the unload sequence is completed at time t2 regardless of the position of the head slider 4. The portion of time t2 to t5 is different from the background art. The VCM current profile shown in FIG. 5(b) has an unload VCM current part U2, a position check VCM current part D1, a re-unload VCM current part R, and a position check VCM current part D2.

First, unloading is performed by the unload VCM current part U2, but the head arm 3 has not returned to the retract position yet because of a disturbance or the like. FIG. 5(b) shows the case in which the speed control drive of the head arm 3 is made unstable by disturbance or the like, and the speed control current part C2 of the unload VCM current part U2 has a waveform different from the speed control current part C1 in FIG. 5(a). Then, with the position check VCM current part D1, a position check drive force is applied to the head arm 3, and it is judged that the head slider 4 has not returned to the retract position yet. Since the head slider 4 has not returned to the retract position yet, re-unloading is performed by the re-unload VCM current part R, and the head slider 4 returns to the retract position. Next, a position check drive force is applied to the head arm 3 by the position check VCM current part D2, and it is judged that the head slider 4 has returned to the retract position. The unload sequence is completed at time t5.

Thus, in accordance with the embodiment of the disk drive of the present invention, a position check drive force of the unload direction is applied to the head arm 3 after unloading is performed, the moving speed of the head slider 4 is detected and it is judged based on this moving speed whether or not the head slider 4 has been unloaded to the retract position. If it has not been unloaded to the retract position, re-unloading is performed, whereby mis-unloading can be prevented.

Although, in the above embodiment of the present invention, the position check data generating means is constructed with the drive force application means and the speed detecting circuit 13 (movement amount detecting means), it is possible to form the position check data generating means using an optical position sensor such as a photo coupler, and position check data is generated from the output of the optical position sensor. Based on the position check data, it is judged by a judging means whether or not the head slider 4 has been unloaded to the retract position. Since the above position check data only needs to be data which shows whether or not the head slider 4 (or head arm 3) is at the retract position, the position check data generating means can be constructed with only one optical position sensor on the disk drive.

Figure 6A:
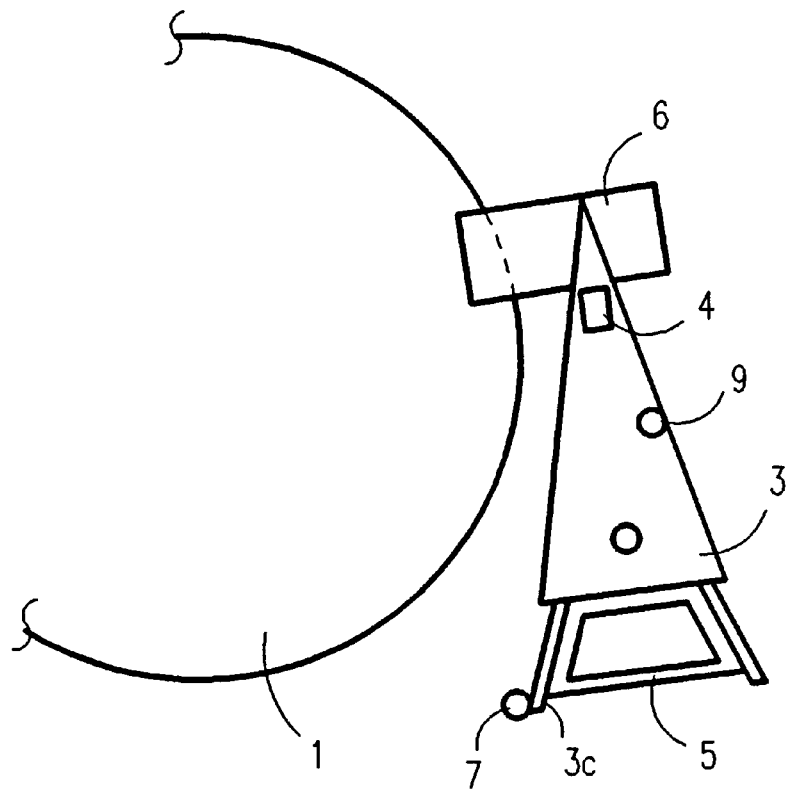
FIGS. 6(a, b) is a diagram showing the peripheral portion of the load/unload mechanism in another embodiment of the disk drive of the present invention.
Figure 6B:
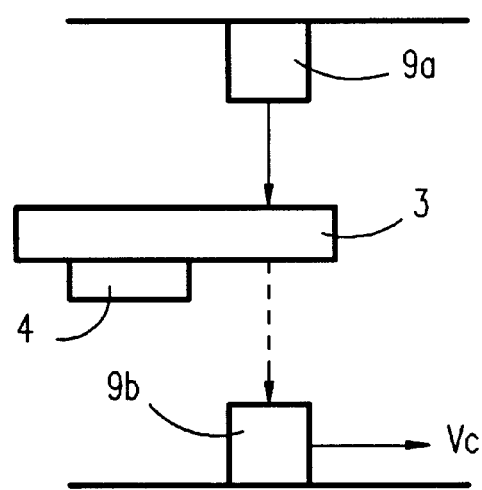

FIG. 6 is a diagram showing the construction of the peripheral portion of the load/unload mechanism in the disk drive of another embodiment of the present invention, in which (a) is a top view, and (b) is a sectional view including a photo coupler 9. FIG. 6 shows the structure obtained by providing a photo coupler 9 in FIG. 2(a). The head mechanism control apparatus of the disk drive shown in FIG. 6 has a position check data generating means using the photo coupler 9. The photo coupler 9 is made up of a light emitting portion 9a and a photo detecting portion 9b. The output voltage Vc of the photo detecting portion 9b has different levels depending whether or not it is receiving the light from the light emitting portion 9a. As shown in FIG. 6, when the head arm 3 is at the retract position, the light from the light emitting portion 9a is blocked by the head arm 3, and thus the photo detecting portion 9b does not receive this light. When the head arm 3 is not at the retract position, the photo detecting portion 9b receives the light from the light emitting portion 9a. Accordingly, based on the output voltage Vc of the photo detecting portion 9b, it can be judged whether or not the As described above, in accordance with the present invention, the position of the transducer head is checked after the execution of unloading, and if the transducer head is not unloaded at the retract position, mis-unloading can be prevented by performing re-unloading for moving the transducer head to the retract position, providing an advantage that the reliability of the head mechanism can be increased.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A head mechanism control apparatus for magnetic recording device for moving a transducer head in a predetermined direction to unload the transducer head from a recording medium, the apparatus comprising:

position check logic for generating position check data to check the transducer head position after an unloading operation is performed;

judging logic for judging, based on the position check data, whether the transducer head has been unloaded to a retract position; and re-unload control logic to unload the transducer head to the retract position when it is judged that the transducer head has not been unloaded to the retract position.

2. A head mechanism control apparatus as set forth in claim 1, wherein said position check logic comprises:

a drive force application control logic for applying a drive force to the transducer head after an unloading operation is performed; and a movement amount detecting logic for detecting the amount of movement of the transducer head when the drive force is applied, wherein the judging logic judges, based on the amount of movement, whether the transducer head has been unloaded to the retract position.

3. A head mechanism control apparatus as set forth in claim 2, wherein apparatus includes a voice coil motor, and the movement amount detecting logic includes a speed voltage detecting circuit for detecting the counterelectromotive force which occurs in the voice coil motor in proportion to the moving speed of the transducer head.

4. A head mechanism control apparatus as set forth in claim 2, wherein the judging logic judges that the transducer head has not been unloaded to the retract position when the detected amount of movement is larger than a predetermined value.

5. A head mechanism control apparatus as set forth in claim 2, wherein the apparatus includes a head arm for supporting the transducer head, and a ramp for supporting the head arm, the head arm slides on the surface of the ramp in a predetermined direction to unload the transducer head, and the drive force enables the head arm to slide on the ramp.

6. A head mechanism control apparatus as set forth in claim 1, wherein the position check logic has an optical position sensor for detecting the position of the transducer head, and generates the position check data from the output of the optical position sensor.

7. A head mechanism control apparatus as set forth in claim 1, further comprising a retry control logic for repeating unloading when the transducer head has not been unloaded to the retract position.

8. A head mechanism control apparatus as set forth in claim 7, where in the retry control logic repeats the unloading until the transducer head is unloaded to the retract position or the number of executions of unloading reaches a predetermined number.

9. A head mechanism control apparatus as set forth in claim 8, wherein said number of repetitive executions of unloading is five.

10. A disk drive comprising a magnetic recording disk, a transducer head supported on a head arm for writing information onto or reading information from the magnetic recording disk, a motor to rotate the disk, a voice coil motor for moving the transducer head to unload the transducer head from the disk, and a head mechanism control apparatus for controlling the unloading operation comprising:

position check logic for generating position check date to check the transducer head position after an unloading operation is performed;

judging logic for judging, based on the position check data, whether the transducer head has been unloaded to a retract position; and re-unload control logic to unload the transducer head to the retract position when it is judged that the transducer head has not been unloaded to the retract position.

* * * * *